(12) United States Patent
Strandborg et al.

(10) Patent No.: US 12,273,504 B1
(45) Date of Patent: Apr. 8, 2025

(54) GAZE-ASSISTED STEREO REPROJECTION

(71) Applicant: Varjo Technologies Oy, Helsinki (FI)

(72) Inventors: Mikko Strandborg, Helsinki (FI); Ville Miettinen, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 18/481,268

(22) Filed: Oct. 5, 2023

(51) Int. Cl.
*H04N 13/383* (2018.01)
*H04N 13/156* (2018.01)
*H04N 13/398* (2018.01)

(52) U.S. Cl.
CPC ......... *H04N 13/383* (2018.05); *H04N 13/156* (2018.05); *H04N 13/398* (2018.05)

(58) Field of Classification Search
None
See application file for complete search history.

(56) References Cited

U.S. PATENT DOCUMENTS

| | | | | |
|---|---|---|---|---|
| 9,710,887 | B1 * | 7/2017 | Sahlsten | G09G 3/003 |
| 11,119,313 | B1 * | 9/2021 | Ollila | G02B 27/0093 |
| 2013/0181984 | A1 * | 7/2013 | Chen | G06T 15/10 |
| | | | | 345/419 |
| 2017/0171538 | A1 * | 6/2017 | Bell | G06T 19/006 |
| 2018/0120573 | A1 * | 5/2018 | Ninan | G02C 7/08 |
| 2020/0359008 | A1 * | 11/2020 | Tanaka | H04N 13/398 |

FOREIGN PATENT DOCUMENTS

WO WO-2019017290 A1 * 1/2019 ............. G02B 30/00

\* cited by examiner

*Primary Examiner* — Kenneth Bukowski
(74) *Attorney, Agent, or Firm* — Ziegler IP Law Group LLC.

(57) ABSTRACT

A left part (LL) of a left image and a right part (RR) of a right image are rendered, wherein a horizontal FOV of the left part of the left image extends towards a right side of a gaze point (X) of the left image till only a first predefined angle (N1) from the gaze point of the left image, while a horizontal FOV of the right part of the right image extends towards a left side of a gaze point (X) of the right image till only a second predefined angle (N2) from the gaze point of the right image. A right part (RL) of the left image is reconstructed by reprojecting a corresponding part of the right image, while a left part (LR) of the right image is reconstructed by reprojecting a corresponding part of the left image. The left image and the right image are generated by combining respective rendered parts and respective reconstructed parts.

10 Claims, 4 Drawing Sheets

GAZE-ASSISTED STEREO REPROJECTION

TECHNICAL FIELD

The present disclosure relates to display apparatuses and methods for generating images by employing gaze-assisted stereo reprojection. The present disclosure also relates to systems and methods for generating images by employing gaze-assisted stereo reprojection.

BACKGROUND

Extended Reality (XR) technology, encompassing virtual, augmented, and mixed reality, has emerged as a revolutionary platform for creating immersive and interactive experiences. The ability to seamlessly interact with virtual, augmented, or mixed reality environments is vital in providing compelling XR experiences to users. However, as XR continues to evolve, there are challenges that need to be addressed to fully unlock its potential and provide seamless user interactions.

One of the significant challenges in XR systems lies in the computational resources required for rendering high-quality visuals. To generate realistic and detailed imagery for XR headsets, substantial processing power is needed, which can lead to performance limitations, such as latency and reduced frame rates. These factors can affect the immersive nature of XR experiences.

In addition to the rendering challenges, cloud-based XR rendering systems face the critical issue of efficient data transmission from remote servers to the XR headset. Bandwidth constraints and latency issues can hinder the delivery of smooth and responsive XR content. As XR applications become more complex and data-intensive, the demand for efficient data transfer mechanisms becomes crucial to ensure a seamless and lag-free user experience.

To address these challenges and advance the capabilities of XR technology, novel solutions are sought to optimize rendering efficiency while minimizing bandwidth requirements. The key challenge is to enhance performance, reduce costs, and foster widespread adoption of XR across various domains.

In light of the above-mentioned, innovative solutions are needed to improve rendering efficiency and minimize bandwidth consumption, so as to enhance the performance and user satisfaction of XR systems.

SUMMARY

The aim of the present disclosure is to provide a display apparatus and a method, and a system and a method for generating a left image and a right image in a highly efficient manner. The aim of the present disclosure is achieved by a display apparatus and a method, and a system and a method in which only a left part of a left image and a right part of a right image are rendered, while a right part of the left image and a left part of the right image are reconstructed, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
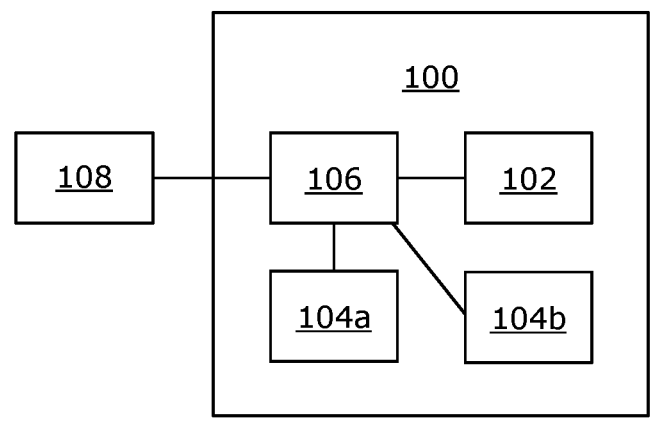
FIG. 1 is a schematic diagram of a display apparatus, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a display apparatus comprising:
- gaze-tracking means;
- at least one left light source and at least one right light source for a left eye and a right eye of a user, respectively; and
- at least one processor configured to:
  - process gaze-tracking data, collected by the gaze-tracking means, to determine a left gaze direction and a right gaze direction of the left eye and the right eye, respectively;
  - send, to a server, information indicative of the left gaze direction and the right gaze direction;
  - receive, from the server, a left part of a left image and a right part of a right image, wherein a horizontal field of view (FOV) of the left part of the left image extends towards a right side of a gaze point of the left image till only a first predefined angle from the gaze point of the left image, while a horizontal FOV of the right part of the right image extends towards a left side of a gaze point of the right image till only a second predefined angle from the gaze point of the right image, the gaze point of the left image and the gaze point of the right image being determined based on the left gaze direction and the right gaze direction, respectively; reconstruct a right part of the left image, by reprojecting a corresponding part of the right image;
  - reconstruct a left part of the right image, by reprojecting a corresponding part of the left image;
  - generate the left image, by combining the received left part and the reconstructed right part of the left image;
  - generate the right image, by combining the reconstructed left part and the received right part of the right image; and display the left image and the right image via the at least one left light source and the at least one right light source, respectively.

In a second aspect, an embodiment of the present disclosure provides a method implemented by a display apparatus, the display apparatus comprising gaze-tracking means, at least one left light source and at least one right light source for a left eye and a right eye of a user, respectively, and at least one processor, wherein the method comprises:

processing gaze-tracking data, collected by the gaze-tracking means, to determine a left gaze direction and a right gaze direction of the left eye and the right eye, respectively;

sending, to a server, information indicative of the left gaze direction and the right gaze direction;

receiving, from the server, a left part of a left image and a right part of a right image, wherein a horizontal field of view (FOV) of the left part of the left image extends towards a right side of a gaze point of the left image till only a first predefined angle from the gaze point of the left image, while a horizontal FOV of the right part of the right image extends towards a left side of a gaze point of the right image till only a second predefined angle from the gaze point of the right image, the gaze point of the left image and the gaze point of the right image being determined based on the left gaze direction and the right gaze direction, respectively;

reconstructing a right part of the left image, by reprojecting a corresponding part of the right image;

reconstructing a left part of the right image, by reprojecting a corresponding part of the left image;

generating the left image, by combining the received left part and the reconstructed right part of the left image;

generating the right image, by combining the reconstructed left part and the received right part of the right image; and displaying the left image and the right image via the at least one left light source and the at least one right light source, respectively.

Pursuant to the first aspect and the second aspect of the present disclosure, only the left part of the left image and the right part of the right image are received from the server, while the right part of the left image and the left part of the right image are reconstructed from the opposite images at the display apparatus. The left image and the right image are then generated by combining the received parts of the images with the parts reconstructed from the opposite images. The aforementioned display apparatus and method leverage gaze tracking to optimize a rendering process at the server, by limiting an area (namely, a part) of an image that is to be rendered for a given eye. This limitation is achieved by constraining the horizontal FOV towards the other eye to a specific predefined angle from the gaze point of the image. Missing pixel values for the right part of the left image and the left part of the right image are then reconstructed seamlessly by employing reprojection, whilst aligning the reconstructed parts with their corresponding rendered parts of the images. This compensates for the restricted FOV that was originally rendered and ensures that the user perceives a complete and coherent visual representation despite the limited rendering area.

Thus, the FOV is optimised for each eye, even though the left part of the left image and the right part of the right image extend towards the right side of the gaze point of the left image and the left side of the gaze point of the right image, respectively, up to the first predefined angle and the second predefined angle only. This tremendously reduces a computational burden on the display apparatus, thereby enabling real-time or near real-time image generation with minimal latency. As a result, a synchronized, seamless and immersive visual experience is provided to the user.

Moreover, in cloud-based extended-reality (XR) rendering systems where images are streamed from the server to the display apparatus, the aforementioned method can bring additional network bandwidth savings during a transport process. The display apparatus is susceptible to be used for various applications, for example, such as gaming, simulation, 3D visualization, and the like. In some implementations, the display apparatus could be employed as a head-mounted display (HMD) device. In other implementations, the display apparatus could be employed as a combination of an HMD device and a computing device that is communicably coupled to the HMD. The term "head-mounted display device" refers to a display device that is employed to present an XR environment to the user when said HMD device, in operation, is worn by the user on his/her head. The HMD device can be implemented, for example, as an XR headset, a pair of XR glasses, and the like, that is operable to display a visual scene of the XR environment to the user.

There will now be considered an example where the first predefined angle and the second predefined angle are equal to 10 degrees. For the left eye, pixels that are 10 degrees or more towards the right side of the gaze point in the left image are not rendered directly. Instead, their pixel values are reconstructed using the corresponding part of the right image rendered for the right eye. Similarly, for the right eye, pixels that are 10 degrees or more towards the left side of the gaze point in the right image are not rendered directly; instead, their pixel values are reconstructed using the corresponding part of the left image rendered for the left eye. This approach provides several benefits. Firstly, it allows the rendering application (of the server) to reduce the number of pixels that need to be rendered for a stereo image, potentially resulting in up to 50% fewer pixels being rendered, depending on chosen values of the first predefined angle and the second predefined angle. Secondly, the savings obtained are not constant across all view spaces, but are dependent on the left gaze direction and the right gaze direction. However, in gaze-centred views, where the gaze point is at a centre of the FOV, the savings are constant, allowing for exclusion of a discrete part of the image.

Pursuant to the first aspect and the second aspect, a primary objective is to provide an improved stereoscopic display experience based on the user's gaze direction, whilst optimizing a rendering performance. The gaze-tracking means could be implemented as light sensors and/or cameras that are employed to collect the gaze-tracking data concerning the left gaze direction and the right gaze direction. As an example, the gaze tracking data can be in a form of images of the user's eyes as captured by the cameras. The gaze-tracking data is processed to accurately determine the left gaze direction and the right gaze direction, which are vital for the subsequent processing steps. Such gaze-tracking is well known in the art.

Upon determining the gaze directions, the information indicative of the left gaze direction and the right gaze direction are sent to the server. The server is configured to generate the left part of the left image and the right part of the right image based on the left gaze direction and the right gaze direction, respectively. In this regard, the server is configured to determine the gaze point of the left image and the gaze point of the right image, based on the left gaze direction and the right gaze direction, respectively, and then to generate the left part of the left image and the right part of the right image extending until the first predefined angle and the second predefined angle from their respective gaze points. It will be appreciated that the left part of the left image and the right part of the right image can be polygonal (for example, rectangular, or similar) or curved (for example, elliptical, circular, or similar) in shape, providing versatility in adjusting the stereoscopic effect.

As mentioned earlier, the left part of the left image extends from the gaze point of the left image towards its right side until the first predefined angle only. Similarly, the right part of the right image extends from the gaze point of the right image towards its left side until the second predefined angle only. This ensures that the left part of the left image and the right part of the right image are generated according to the user's gaze directions, whilst taking into account the first predefined angle and the second predefined angle. This, in turn, ensures that an entirety of the left image and an entirety of the right image can be generated accurately, by taking advantage of a fact that the left image and the right image complement each other stereoscopically.

Throughout the present disclosure, the term "FOV" refers to an angular extent of a region of an environment that can be observed by the user's eyes, wherein the horizontal FOV covers a left-to-right span of said region. It will also be appreciated that the first predefined angle can be same as or different from the second predefined angle. The first predefined angle and the second predefined angle can be customized independently. The first predefined angle and the second predefined angle lie can be any angle smaller than or equal to a half of the horizontal FOV. This ensures that the limitation applied on the angular extent of the rendered parts is comfortable and does not impair the user's viewing experience. More optionally, the first predefined angle and the second predefined angle lie within a range of 2 degrees to 22.5 degrees. The lower bound of this range corresponds to a typical angular width of a gaze region of an FOV of the user whose image is focused at a fovea of the user's eye. This means that the display apparatus can be configured to finely adjust the image parts to ensure a precise alignment with the user's gaze direction, whilst enhancing the stereoscopic experience. Conversely, the upper bound of the range corresponds to a half of a typical angular width of a region of interest in the FOV of the user. Setting the upper bound at 22.5 degrees allows for more flexible configurations, thereby permitting variations in the stereoscopic display to accommodate different applications. Overall, this range enables the display apparatus to tailor the stereoscopic display with utmost precision, whilst still maintaining the flexibility to accommodate different angular widths beyond the gaze point, all of which ultimately contribute to an improved and immersive user experience.

Furthermore, after receiving the left part of the left image and the right part of the right image from the server, the at least one processor of the display apparatus is configured to perform image reprojection. The right part of the left image is reconstructed by reprojecting the corresponding part of the right image, and the left part of the right image is reconstructed by reprojecting the corresponding part of the left image. Such a reprojection can be performed by employing any one of: a three degrees-of-freedom (3DOF) reprojection, a six degrees-of-freedom (6DOF) reprojection, a nine degrees-of-freedom (9DOF) reprojection. Image reprojection is well known in the art.

It will be appreciated that the reprojection process may exhibit image artifacts as a result of disocclusions; however, as the reprojection is only used for a peripheral part of the horizontal FOV, such artifacts are not noticeable to the user.

Moreover, originally-rendered parts of the left image and the right image (namely, the left part of the left image and the right part of the right image) are displayed to the left eye and the right eye; therefore, any artifacts resulting from the reprojection process are unnoticeable to the user, because of an inherent capability of a human brain to combine of the left image and the right image to generate a combined image. Furthermore, a synchronized, seamless and immersive visual experience is provided to the user, even if a blind spot is created directly between the perspectives of the left eye and the right eye; these technical benefits arise from a fact that the user's gaze has converged further away in a given visual scene than the blind spot, which, in turn, means that the blind spot between the gaze point and the user's eyes are unobstructed.

As the reprojection of the remaining parts is performed at the display apparatus, the server can pre-calculate and send an acceleration structure pertaining to depth information to the display apparatus. This allows for efficient and faster reprojection at the display apparatus, thereby reducing the required bandwidth. It will be appreciated that the acceleration structure could be sent, instead of a depth map, which allows for a reduced requirement for network transmission bandwidth and for processing at the display apparatus. Herein, the term "acceleration structure" refers to a data structure comprising at least geometric information of objects or their parts represented in a given image. Examples of the acceleration structure include, but are not limited to, a polygonal mesh, a point cloud, a surface cloud, a surflet cloud, a 3D grid, a 3D hierarchical grid, a bounding volume hierarchy, a cone angle map. The aforesaid acceleration structures are well-known in the art. In implementations where the display apparatus receives such an acceleration structure from the server, the reprojection can be performed by employing a 6DOF reprojection or a 9DOF reprojection.

Following the image reprojection, the at least one processor is configured to combine the received left part of the left image with the reconstructed right part of the left image to generate the left image, and to combine the reconstructed left part of the right image with the received right part of the right image to generate the right image. Such combining aligns the image parts seamlessly, thereby contributing to coherent and natural stereoscopic images. It will be appreciated that such combining can be performed by employing an image stitching technique. Image stitching techniques are well known in the art.

To present such stereoscopic images to the user, the display apparatus employs the at least one left light source and the at least one right light source. The left image is displayed using the at least one left light source, while the right image is displayed using the at least one right light source. The at least one left light source and the at least one right light source can be implemented as displays or projectors.

Moreover, optionally, the at least one processor is configured to receive, from the server, a lower-resolution copy of the right part of the left image, wherein, when reconstructing the right part of the left image, the at least one processor is configured to:

detect at least one disocclusion area in the right part of the left image, when reprojecting the corresponding part of the right image to reconstruct the right part of the left image; and utilise the lower-resolution copy of the right part of the left image to reconstruct the at least one disocclusion area in the right part of the left image.

The term "disocclusion area" refers to an area of a reprojected image where information is found to be missing upon reprojection, due to a difference in perspectives between the left eye and the right eye. In a case when the reprojection of the corresponding part of the right image results in the at least one disocclusion area in the reconstructed right part of the left image, the at least one disocclusion area is addressed by utilizing the lower-resolution copy of the right part of the left image, thereby facilitating a complete reconstruction of the right part of the left image. The lower-resolution copy of the right part of the left image may, for example, have a resolution that is one-fourth or one-eighth of an original resolution of the right part of the left image.

The missing information in the at least one disocclusion area is effectively filled in by utilising the lower-resolution copy, thereby resulting in a more seamless and complete stereoscopic image reconstruction. Thus, the utilization of the lower-resolution copy of the right part of the left image streamlines the reconstruction process, whilst minimizing computational overhead. Additionally, the detection and correction of the at least one disocclusion area through the utilization of the lower-resolution copy further facilitates a more immersive and visually appealing stereoscopic experience for the user.

Likewise, optionally, the at least one processor is configured to receive, from the server, a lower-resolution copy of the left part of the right image, wherein, when reconstructing the left part of the right image, the at least one processor is configured to:
 detect at least one disocclusion area in the left part of the right image, when reprojecting the corresponding part of the left image to reconstruct the left part of the right image; and
 utilise the lower-resolution copy of the left part of the right image to reconstruct the at least one disocclusion area in the left part of the right image.

In a case when the reprojection of the corresponding part of the left image results in the at least one disocclusion area in the reconstructed left part of the right image, the at least one disocclusion area is addressed by utilizing the lower-resolution copy of the left part of the right image, thereby facilitating a complete reconstruction of the left part of the right image. The lower-resolution copy of the left part of the right image may, for example, have a resolution that is one-fourth or one-eighth of an original resolution of the left part of the right image.

The missing information in the at least one disocclusion area is effectively filled in by utilising the lower-resolution copy, thereby resulting in a more seamless and complete stereoscopic image reconstruction. Thus, the utilization of the lower-resolution copy of the left part of the right image streamlines the reconstruction process, whilst minimizing computational overhead. Additionally, the detection and correction of the at least one disocclusion area through the utilization of the lower-resolution copy further facilitates a more immersive and visually appealing stereoscopic experience for the user.

In this way, such utilization of the lower-resolution copy of the right part of the left image and the lower-resolution copy of the left part of the right image to correct the disocclusion areas facilitates a well-balanced and immersive stereoscopic display experience for both eyes of the user, thereby resulting in an exceptional visual experience for the user.

The present disclosure also relates to the method as described above. Various embodiments and variants disclosed above, with respect to the aforementioned display apparatus, apply mutatis mutandis to the method of the second aspect.

Optionally, in the method, the first predefined angle and the second predefined angle lie within a range of 2 degrees to 22.5 degrees.

Optionally, the method further comprises receiving, from the server, a lower-resolution copy of the right part of the left image, wherein the step of reconstructing the right part of the left image comprises:
 detecting at least one disocclusion area in the right part of the left image, when reprojecting the corresponding part of the right image to reconstruct the right part of the left image; and
 utilising the lower-resolution copy of the right part of the left image to reconstruct the at least one disocclusion area in the right part of the left image.

Optionally, the method further comprises receiving, from the server, a lower-resolution copy of the left part of the right image, wherein the step of reconstructing the left part of the right image comprises:
 detecting at least one disocclusion area in the left part of the right image, when reprojecting the corresponding part of the left image to reconstruct the left part of the right image; and
 utilising the lower-resolution copy of the left part of the right image to reconstruct the at least one disocclusion area in the left part of the right image.

Furthermore, in order to further reduce computational burden, delays and power consumption at the display apparatus, it is possible to perform at least some of the aforementioned steps at the server side. In this regard, there will now be provided some additional aspects.

In a third aspect, an embodiment of the present disclosure provides a system comprising at least one server that is communicably coupled to at least one display apparatus, the at least one server configured to:
 receive, from the at least one display apparatus, information indicative of a left gaze direction and a right gaze direction of a left eye and a right eye of a user, respectively;
 determine a gaze point of a left image and a gaze point of a right image based on the left gaze direction and the right gaze direction, respectively;
 render a left part of the left image and a right part of the right image, wherein a horizontal field of view (FOV) of the left part of the left image extends towards a right side of the gaze point of the left image till only a first predefined angle from the gaze point of the left image, while a horizontal FOV of the right part of the right image extends towards a left side of the gaze point of the right image till only a second predefined angle from the gaze point of the right image;
 reconstruct a right part of the left image, by reprojecting a corresponding part of the right image;
 reconstruct a left part of the right image, by reprojecting a corresponding part of the left image;
 generate the left image, by combining the rendered left part and the reconstructed right part of the left image;
 generate the right image, by combining the reconstructed left part and the rendered right part of the right image; and
 send the left image and the right image to the at least one display apparatus.

In a fourth aspect, an embodiment of the present disclosure provides a method implemented by at least one server, the method comprising:

receiving, from at least one display apparatus, information indicative of a left gaze direction and a right gaze direction of a left eye and a right eye of a user, respectively;

determining a gaze point of a left image and a gaze point of a right image based on the left gaze direction and the right gaze direction, respectively;

rendering a left part of the left image and a right part of the right image, wherein a horizontal field of view (FOV) of the left part of the left image extends towards a right side of the gaze point of the left image till only a first predefined angle from the gaze point of the left image, while a horizontal FOV of the right part of the right image extends towards a left side of the gaze point of the right image till only a second predefined angle from the gaze point of the right image;

reconstructing a right part of the left image, by reprojecting a corresponding part of the right image;

reconstructing a left part of the right image, by reprojecting a corresponding part of the left image;

generating the left image, by combining the rendered left part and the reconstructed right part of the left image;

generating the right image, by combining the reconstructed left part and the rendered right part of the right image; and sending the left image and the right image to the at least one display apparatus.

The third aspect differs from the first aspect in many ways. In the first aspect, the server may be configured to render an entirety of the left image and an entirety of the right image, and then send only the left part of the left image and the right part of the right image to the display apparatus. Optionally, in the first aspect, the server may be configured to utilise the entirety of the rendered left image and the entirety of the rendered right image to generate a lower-resolution copy of the left image and a lower-resolution copy of the right image, which may be utilised for disocclusion areas as described earlier.

On the other hand, in the third aspect, the at least one server is configured to render only the left part of the left image and the right part of the right image. In other words, the entire left image and the entire right image are not rendered. The at least one server is configured to reconstruct the right part of the left image and the left part of the right image, by reprojecting the corresponding part of the right image and the corresponding part of the left image, respectively.

A technical benefit of rendering only the left part of the left image and the right part of the right image at the at least one server is that the process of rendering can be performed much faster as compared to a case where the entire left image and the entire right image are rendered at the at least one server, thereby improving a frame rate at which images are generated. This may be particularly beneficial in a case where image data of the left part of the left image and image data of the right part of the right image are read out from a left image sensor and a right image sensor, and then processed by the at least one server. In such a case, the at least one server may be configured to obtain the image data from the left image sensor and the right image sensor, or an imaging system that comprises the left image sensor and the right image sensor. Optionally, in this regard, the system further comprises the left image sensor and the right image sensor.

Moreover, a technical benefit of reconstructing the right part of the left image and the left part of the right image at the at least one server is that the display apparatus does not need to spend its already limited computational resources on the reconstruction process, and can utilise it for other tasks. As the reconstruction process is performed at the at least one server, which already has depth information corresponding to the left image and the right image, the reprojection could be employed using a 6DOF reprojection or a 9DOF reprojection, thereby yielding a better image quality for the reconstructed parts. Optionally, in this regard, the at least one server is configured to access a 3D model of a real-world environment from at least one data repository, and utilise the 3D model to generate the depth information. It will be appreciated that the at least one server can be implemented as a cloud server, or a computing device that is communicably coupled to the display apparatus (for example, an HMD). The at least one data repository could be implemented, for example, such as a memory of the at least one server, a memory of the computing device, a removable memory, a cloud-based database, or similar. Optionally, the system further comprises the at least one data repository, which is communicably coupled to the at least one server.

In conclusion, the third aspect concerns the system in which the at least one server plays a pivotal role in image rendering and reconstruction, whilst optimizing the stereoscopic images based on the left gaze direction and the right gaze direction. By delegating specific tasks to the at least one server, the display apparatus can focus on efficiently displaying the left image and the right image, thereby enhancing the overall user experience. The system of the third aspect provides a robust and versatile solution for various applications.

Various steps of the third aspect can be performed in a similar manner as described earlier with respect to the first aspect. Optionally, the first predefined angle and the second predefined angle lie within a range of 2 degrees to 22.5 degrees.

The present disclosure also relates to the method as described above. Various embodiments and variants disclosed above, with respect to the aforementioned system, apply mutatis mutandis to the method of the fourth aspect.

DETAILED DESCRIPTION OF THE DRAWINGS

Referring to FIG. 1, illustrated is a schematic diagram of a display apparatus 100, in accordance with an embodiment of the present disclosure. The display apparatus 100 comprises gaze-tracking means 102, at least one left light source (depicted as a light source 104a) and at least one right light source (depicted as a light source 104b) for a left eye and a right eye of a user, respectively, and at least one processor (depicted as a processor 106). The processor 106 is communicably coupled to the gaze-tracking means 102, the light source 104a and the light source 104b.

With reference to FIG. 1, the display apparatus 100 is communicably coupled to a server 108, which is configured to receive, from the display apparatus 100, information indicative of a left gaze direction and a right gaze direction, and to send to the display apparatus 100 a left part of a left image and a right part of a right image, accordingly. The processor 106 is configured to perform various operations according to the aforementioned first aspect, as described earlier.

It may be understood by a person skilled in the art that FIG. 1 includes a simplified architecture of the display apparatus 100, for the sake of clarity, which should not unduly limit the scope of the claims herein. It is to be understood that the specific implementation of the display apparatus 100 is provided as an example and is not to be construed as limiting it to specific numbers or types of gaze-tracking means, light sources and processors. The person skilled in the art will recognize many variations, alternatives, and modifications of embodiments of the present disclosure.

Figure 2:
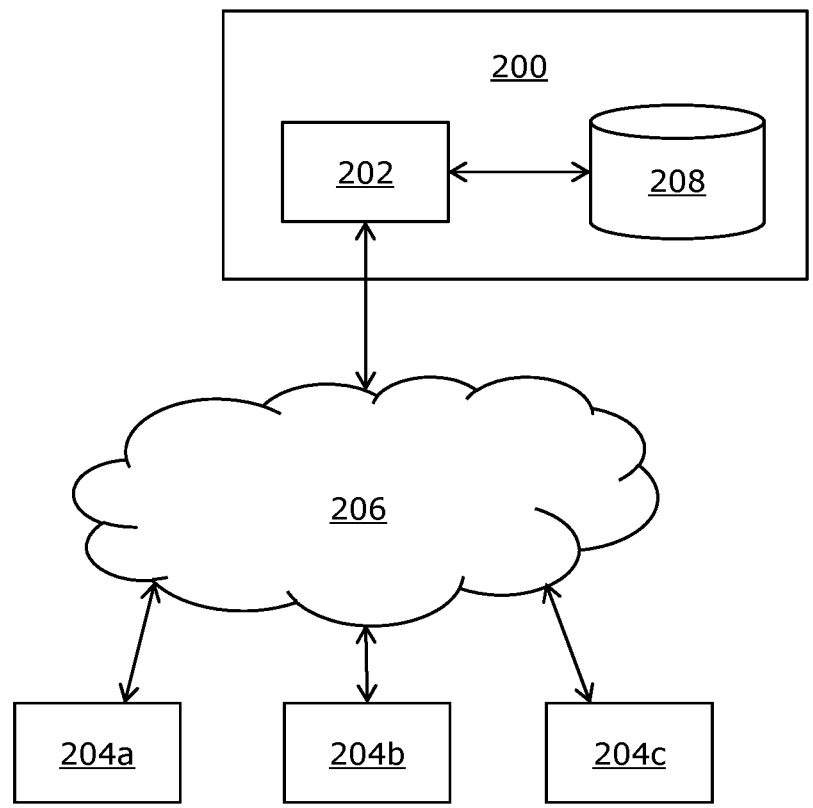
FIG. 2 is a schematic diagram of a network environment in which a system can be implemented, in accordance with an embodiment of the present disclosure.

FIG. 2 illustrates a schematic diagram of a network environment in which a system 200 can be implemented, in accordance with an embodiment of the present disclosure. The system 200 comprises at least one server (depicted as a server 202) that is communicably coupled to at least one display apparatus (depicted as display apparatuses 204a-c), for example, via a communication network 206. The system 200 optionally comprises at least one data repository (depicted as a data repository 208) that is communicably coupled to the server 202. The server 202 is configured to perform various operations according to the aforementioned third aspect, as described earlier.

It may be understood by a person skilled in the art that FIG. 2 illustrates a simplified block diagram of the network environment, for the sake of clarity, which should not unduly limit the scope of the claims herein. It is to be understood that the specific implementation of the system 200 is provided as an example and is not to be construed as limiting it to specific numbers or types of servers, display apparatuses, communication networks and data repositories. The person skilled in the art will recognize many variations, alternatives, and modifications of embodiments of the present disclosure.

Figure 3:
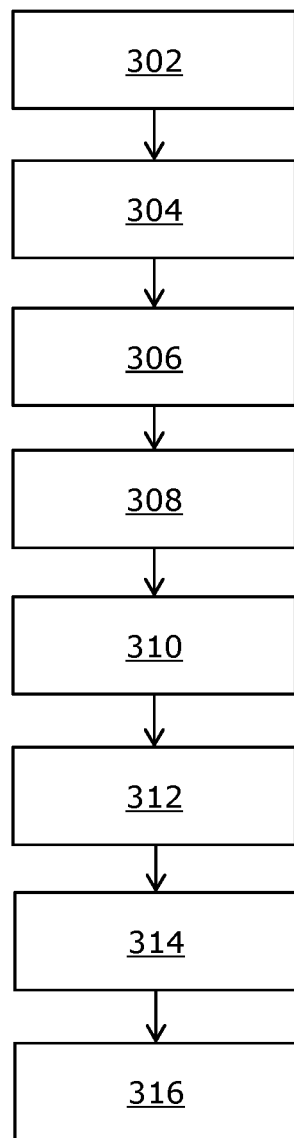
FIG. 3 illustrates steps of a method implemented by a display apparatus, in accordance with an embodiment of the present disclosure.

FIG. 3 illustrates steps of a method implemented by a display apparatus, in accordance with an embodiment of the present disclosure. At a step 302, gaze-tracking data, collected by gaze-tracking means of the display apparatus, is processed to determine a left gaze direction and a right gaze direction of the left eye and the right eye, respectively. At a step 304, information indicative of the left gaze direction and the right gaze direction is sent to a server. At a step 306, a left part of a left image and a right part of a right image are received from the server, wherein a horizontal FOV of the left part of the left image extends towards a right side of a gaze point of the left image till only a first predefined angle from the gaze point of the left image, while a horizontal FOV of the right part of the right image extends towards a left side of a gaze point of the right image till only a second predefined angle from the gaze point of the right image, the gaze point of the left image and the gaze point of the right image being determined based on the left gaze direction and the right gaze direction, respectively. At a step 308, a right part of the left image is reconstructed by reprojecting a corresponding part of the right image. At a step 310, a left part of the right image is reconstructed by reprojecting a corresponding part of the left image. At a step 312, the left image is generated by combining the received left part and the reconstructed right part of the left image. At a step 314, the right image is generated by combining the reconstructed left part and the received right part of the right image. At a step 316, the left image and the right image are displayed via at least one left light source and at least one right light source of the display apparatus, respectively.

The aforementioned steps are only illustrative and other alternatives can also be provided where one or more steps are added, one or more steps are removed, or one or more steps are provided in a different sequence without departing from the scope of the claims. As an example, the steps 308 and 310 can be performed simultaneously. As another example, the steps 312 and 314 can be performed simultaneously.

Figure 4:
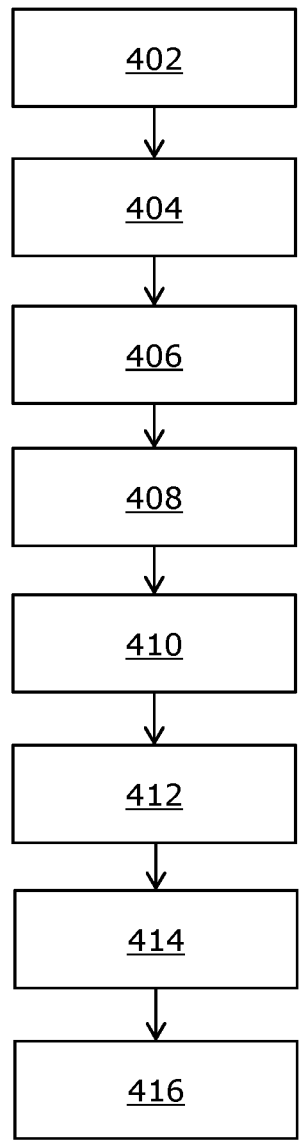
FIG. 4 illustrates steps of a method implemented by at least one server, in accordance with another embodiment of the present disclosure.

FIG. 4 illustrates steps of a method implemented by at least one server, in accordance with another embodiment of the present disclosure. At a step 402, information indicative of a left gaze direction and a right gaze direction of a left eye and a right eye of a user, respectively, is received from at least one display apparatus. At a step 404, a gaze point of a left image and a gaze point of a right image are determined, based on the left gaze direction and the right gaze direction, respectively. At a step 406, a left part of the left image and a right part of the right image are rendered, wherein a horizontal FOV of the left part of the left image extends towards a right side of the gaze point of the left image till only a first predefined angle from the gaze point of the left image, while a horizontal FOV of the right part of the right image extends towards a left side of the gaze point of the right image till only a second predefined angle from the gaze point of the right image. At a step 408, a right part of the left image is reconstructed by reprojecting a corresponding part of the right image. At a step 410, a left part of the right image is reconstructed by reprojecting a corresponding part of the left image. At a step 412, the left image is generated by combining the rendered left part and the reconstructed right part of the left image. At a step 414, the right image is generated by combining the reconstructed left part and the rendered right part of the right image. At a step 416, the left image and the right image are sent to the at least one display apparatus.

The aforementioned steps are only illustrative and other alternatives can also be provided where one or more steps are added, one or more steps are removed, or one or more steps are provided in a different sequence without departing from the scope of the claims. As an example, the steps 408 and 410 can be performed simultaneously. As another example, the steps 412 and 414 can be performed simultaneously.

Figure 5:
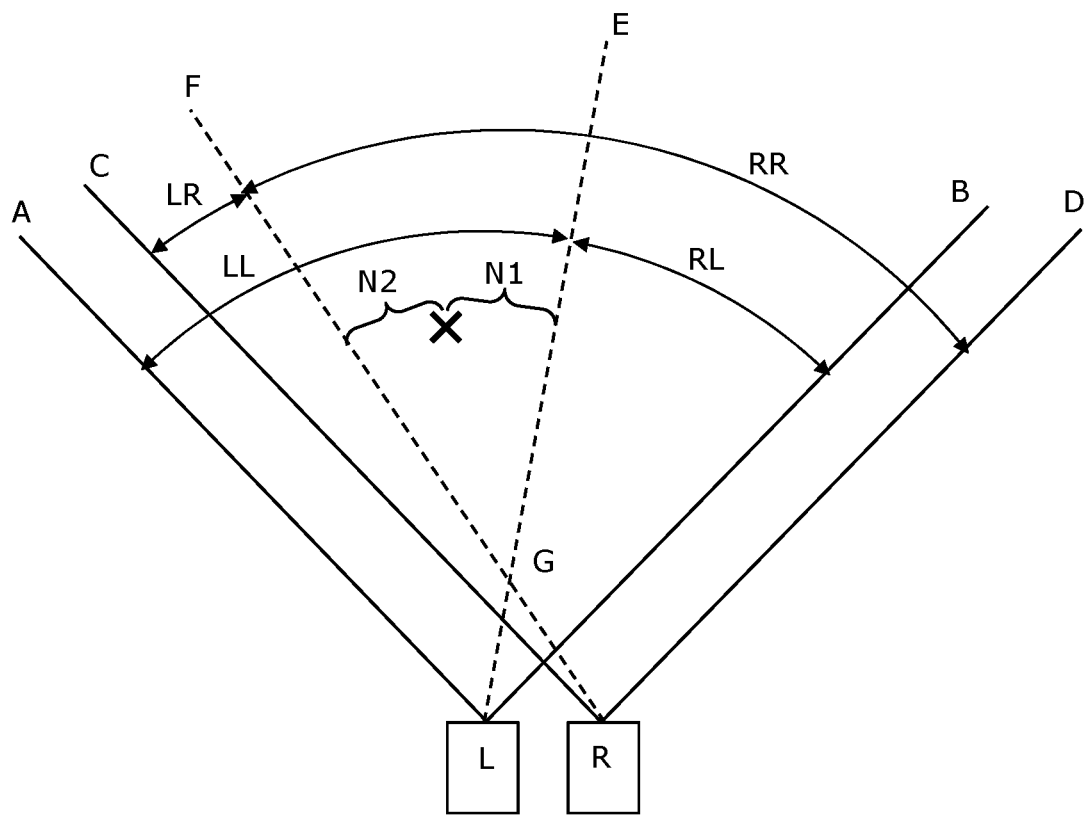
FIG. 5 is a schematic diagram of a horizontal angular extent of a left image and a right image, in accordance with an embodiment of the present disclosure.

FIG. 5 is a schematic diagram of a horizontal angular extent of a left image and a right image, in accordance with an embodiment of the present disclosure. A horizontal field of view for a left eye L and a horizontal field of view for a right eye R are depicted with an angle ALB and an angle CRD, respectively. A gaze point of a left image and a gaze point of a right image are depicted with a point X. An angular extent of a left part LL of a left image is depicted with an angle ALE, wherein a horizontal FOV of the left part LL of the left image extends towards a right side of the gaze point X of the left image till only a first predefined angle N1 from the gaze point X of the left image. Likewise, an angular extent of a right part RR of a right image is depicted with an angle FRD, wherein a horizontal FOV of the right part RR of the right image extends towards a left side of the gaze point X of the right image till only a second predefined angle N2 from the gaze point X of the right image.

An angular extent of a right part RL of the left image is depicted with an angle ELB, while an angular extent of a left part LR of the right image is depicted with an angle CRF. As described earlier, the right part RL of the left image and the left part LR of the right image are reconstructed from a corresponding part of the right image and a corresponding part of the left image, respectively.

A blind spot in the FOV can be depicted as a region LGR. A synchronized, seamless and immersive visual experience is provided to the user, even if the blind spot is created directly between the perspectives of the left eye L and the right eye R. These technical benefits arise from a fact that the user's gaze has converged further away in a given visual scene than the blind spot, which, in turn, means that the blind spot between the gaze point X and the user's eyes is unobstructed.

FIG. 5 is merely an example, which should not unduly limit the scope of the claims herein. A person skilled in the art will recognize many variations, alternatives, and modifications of embodiments of the present disclosure.

The invention claimed is:

1. A display apparatus comprising:
gaze-tracking means;
at least one left light source and at least one right light source for a left eye and a right eye of a user, respectively; and
at least one processor configured to:
process gaze-tracking data, collected by the gaze-tracking means, to determine a left gaze direction and a right gaze direction of the left eye and the right eye, respectively;
send, to a server, information indicative of the left gaze direction and the right gaze direction;
receive, from the server, a left part of a left image and a right part of a right image, wherein a horizontal field of view (FOV) of the left part of the left image extends towards a right side of a gaze point of the left image till only a first predefined angle from the gaze point of the left image, while a horizontal FOV of the right part of the right image extends towards a left side of a gaze point of the right image till only a second predefined angle from the gaze point of the right image, the gaze point of the left image and the gaze point of the right image being determined based on the left gaze direction and the right gaze direction, respectively;
reconstruct a right part of the left image, by reprojecting a corresponding part of the right image;
reconstruct a left part of the right image, by reprojecting a corresponding part of the left image;
generate the left image, by combining the received left part and the reconstructed right part of the left image;
generate the right image, by combining the reconstructed left part and the received right part of the right image;
display the left image and the right image via the at least one left light source and the at least one right light source, respectively; and
receive, from the server, a lower-resolution copy of the right part of the left image,
wherein, when reconstructing the right part of the left image, the at least one processor is configured to:
detect at least one disocclusion area in the right part of the left image, when reprojecting the corresponding part of the right image to reconstruct the right part of the left image; and
utilise the lower-resolution copy of the right part of the left image to reconstruct the at least one disocclusion area in the right part of the left image.

2. The display apparatus of claim 1, wherein the first predefined angle and the second predefined angle lie within a range of 2 degrees to 22.5 degrees.

3. A display apparatus comprising:
gaze-tracking means;
at least one left light source and at least one right light source for a left eye and a right eye of a user, respectively; and
at least one processor configured to:
process gaze-tracking data, collected by the gaze-tracking means, to determine a left gaze direction and a right gaze direction of the left eye and the right eye, respectively;
send, to a server, information indicative of the left gaze direction and the right gaze direction;
receive, from the server, a left part of a left image and a right part of a right image, wherein a horizontal field of view (FOV) of the left part of the left image extends towards a right side of a gaze point of the left image till only a first predefined angle from the gaze point of the left image, while a horizontal FOV of the right part of the right image extends towards a left side of a gaze point of the right image till only a second predefined angle from the gaze point of the right image, the gaze point of the left image and the gaze point of the right image being determined based on the left gaze direction and the right gaze direction, respectively;
reconstruct a right part of the left image, by reprojecting a corresponding part of the right image;
reconstruct a left part of the right image, by reprojecting a corresponding part of the left image;
generate the left image, by combining the received left part and the reconstructed right part of the left image;
generate the right image, by combining the reconstructed left part and the received right part of the right image;
display the left image and the right image via the at least one left light source and the at least one right light source, respectively;
receive, from the server, a lower-resolution copy of the left part of the right image,
wherein, when reconstructing the left part of the right image, the at least one processor is configured to:
detect at least one disocclusion area in the left part of the right image, when reprojecting the corresponding part of the left image to reconstruct the left part of the right image; and
utilise the lower-resolution copy of the left part of the right image to reconstruct the at least one disocclusion area in the left part of the right image.

4. A method implemented by a display apparatus, the display apparatus comprising gaze-tracking means, at least one left light source and at least one right light source for a left eye and a right eye of a user, respectively, and at least one processor, wherein the method comprises:
processing gaze-tracking data, collected by the gaze-tracking means, to determine a left gaze direction and a right gaze direction of the left eye and the right eye, respectively;
sending, to a server, information indicative of the left gaze direction and the right gaze direction;
receiving, from the server, a left part of a left image and a right part of a right image, wherein a horizontal field of view (FOV) of the left part of the left image extends towards a right side of a gaze point of the left image till only a first predefined angle from the gaze point of the left image, while a horizontal FOV of the right part of the right image extends towards a left side of a gaze point of the right image till only a second predefined angle from the gaze point of the right image, the gaze point of the left image and the gaze point of the right image being determined based on the left gaze direction and the right gaze direction, respectively;
reconstructing a right part of the left image, by reprojecting a corresponding part of the right image;

reconstructing a left part of the right image, by reprojecting a corresponding part of the left image;
generating the left image, by combining the received left part and the reconstructed right part of the left image;
generating the right image, by combining the reconstructed left part and the received right part of the right image; and
displaying the left image and the right image via the at least one left light source and the at least one right light source, respectively;
receiving, from the server, a lower-resolution copy of the right part of the left image,
wherein the step of reconstructing the right part of the left image comprises:
  detecting at least one disocclusion area in the right part of the left image, when reprojecting the corresponding part of the right image to reconstruct the right part of the left image; and
  utilising the lower-resolution copy of the right part of the left image to reconstruct the at least one disocclusion area in the right part of the left image.

5. The method of claim 4, wherein the first predefined angle and the second predefined angle lie within a range of 2 degrees to 22.5 degrees.

6. A method implemented by a display apparatus, the display apparatus comprising gaze-tracking means, at least one left light source and at least one right light source for a left eye and a right eye of a user, respectively, and at least one processor, wherein the method comprises:
  processing gaze-tracking data, collected by the gaze-tracking means, to determine a left gaze direction and a right gaze direction of the left eye and the right eye, respectively;
  sending, to a server, information indicative of the left gaze direction and the right gaze direction;
  receiving, from the server, a left part of a left image and a right part of a right image, wherein a horizontal field of view (FOV) of the left part of the left image extends towards a right side of a gaze point of the left image till only a first predefined angle from the gaze point of the left image, while a horizontal FOV of the right part of the right image extends towards a left side of a gaze point of the right image till only a second predefined angle from the gaze point of the right image, the gaze point of the left image and the gaze point of the right image being determined based on the left gaze direction and the right gaze direction, respectively;
  reconstructing a right part of the left image, by reprojecting a corresponding part of the right image;
  reconstructing a left part of the right image, by reprojecting a corresponding part of the left image;
  generating the left image, by combining the received left part and the reconstructed right part of the left image;
  generating the right image, by combining the reconstructed left part and the received right part of the right image; and
  displaying the left image and the right image via the at least one left light source and the at least one right light source, respectively;
  receiving, from the server, a lower-resolution copy of the left part of the right image,
  wherein the step of reconstructing the left part of the right image comprises:
    detecting at least one disocclusion area in the left part of the right image, when reprojecting the corresponding part of the left image to reconstruct the left part of the right image; and
    utilising the lower-resolution copy of the left part of the right image to reconstruct the at least one disocclusion area in the left part of the right image.

7. A system comprising at least one server that is communicably coupled to at least one display apparatus, the at least one server configured to:
  receive, from the at least one display apparatus, information indicative of a left gaze direction and a right gaze direction of a left eye and a right eye of a user, respectively;
  determine a gaze point of a left image and a gaze point of a right image based on the left gaze direction and the right gaze direction, respectively;
  render a left part of the left image and a right part of the right image, wherein a horizontal field of view (FOV) of the left part of the left image extends towards a right side of the gaze point of the left image till only a first predefined angle from the gaze point of the left image, while a horizontal FOV of the right part of the right image extends towards a left side of the gaze point of the right image till only a second predefined angle from the gaze point of the right image;
  reconstruct a right part of the left image, by reprojecting a corresponding part of the right image;
  reconstruct a left part of the right image, by reprojecting a corresponding part of the left image;
  generate the left image, by combining the rendered left part and the reconstructed right part of the left image;
  generate the right image, by combining the reconstructed left part and the rendered right part of the right image;
  send the left image and the right image to the at least one display apparatus;
  receive from the server, a lower-resolution copy of the right part of the left image; and
  when reconstructing the right part of the left image:
    detecting at least one disocclusion area in the right part of the left image, when reprojecting the corresponding part of the right image to reconstruct the right part of the left image; and
    utilising the lower-resolution copy of the right part of the left image to reconstruct the at least one disocclusion area in the right part of the left image.

8. The system of claim 7, wherein the first predefined angle and the second predefined angle lie within a range of 2 degrees to 22.5 degrees.

9. A method implemented by at least one server, the method comprising:
  receiving, from at least one display apparatus, information indicative of a left gaze direction and a right gaze direction of a left eye and a right eye of a user, respectively;
  determining a gaze point of a left image and a gaze point of a right image based on the left gaze direction and the right gaze direction, respectively;
  rendering a left part of the left image and a right part of the right image, wherein a horizontal field of view (FOV) of the left part of the left image extends towards a right side of the gaze point of the left image till only a first predefined angle from the gaze point of the left image, while a horizontal FOV of the right part of the right image extends towards a left side of the gaze point of the right image till only a second predefined angle from the gaze point of the right image;
  reconstructing a right part of the left image, by reprojecting a corresponding part of the right image;
  reconstructing a left part of the right image, by reprojecting a corresponding part of the left image;

generating the left image, by combining the rendered left part and the reconstructed right part of the left image;

generating the right image, by combining the reconstructed left part and the rendered right part of the right image;

sending the left image and the right image to the at least one display apparatus;

receiving from the server, a lower-resolution copy of the right part of the left image; and when reconstructing the right part of the left image:
- detecting at least one disocclusion area in the right part of the left image, when reprojecting the corresponding part of the right image to reconstruct the right part of the left image; and
- utilising the lower-resolution copy of the right part of the left image to reconstruct the at least one disocclusion area in the right part of the left image.

10. The method of claim 9, wherein the first predefined angle and the second predefined angle lie within a range of 2 degrees to 22.5 degrees.

* * * * *